April 4, 1961         G. T. RUGLAND ET AL         2,977,689
               MULTIPLE CHOICE RESPONSE DEVICE
                      Filed Oct. 30, 1958
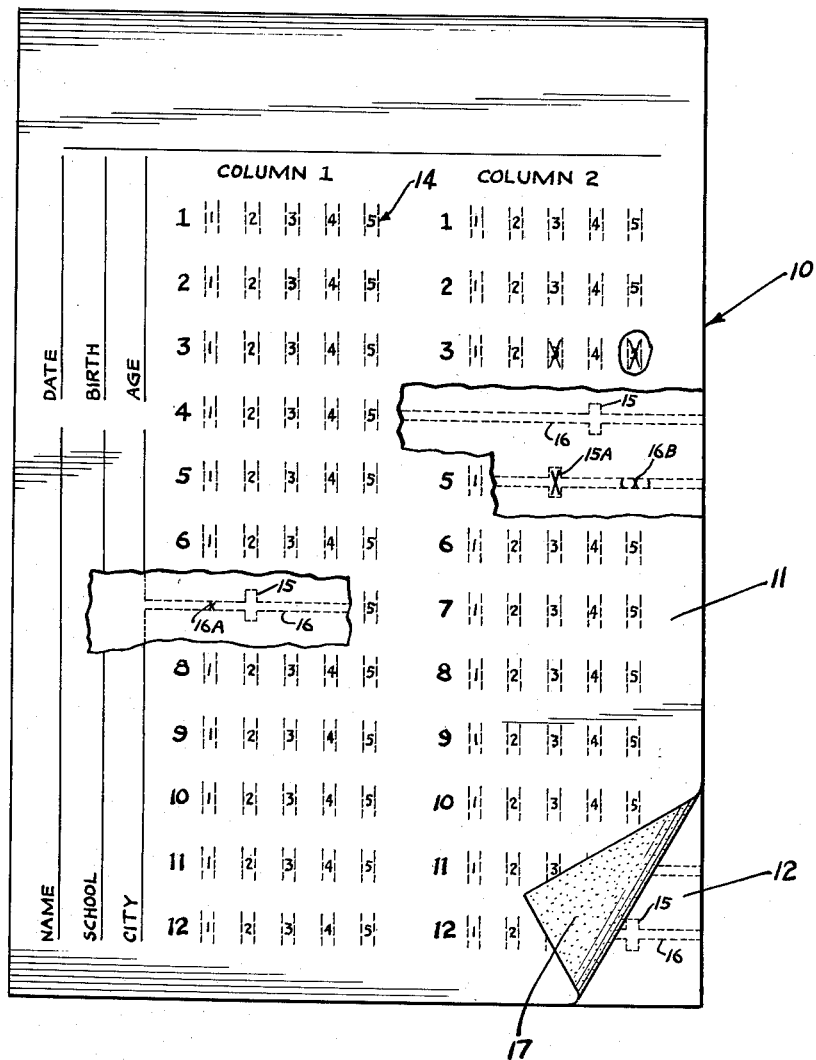
INVENTORS
GERHARD T. RUGLAND
BY JOHN P. YACKEL
   ARTHUR P. BERGEE
   Moore, White + Burd
                ATTORNEYS

# United States Patent Office 2,977,689
Patented Apr. 4, 1961

2,977,689

MULTIPLE CHOICE RESPONSE DEVICE

Gerhard T. Rugland, John P. Yackel, and Arthur P. Bergee, all of Box 127, Circle Pines, Minn.

Filed Oct. 30, 1958, Ser. No. 770,705

3 Claims. (Cl. 35—48)

This invention relates to a multiple choice response device adapted for use in the production and administration of objective tests, scales, examinations, games and the like. More particularly, this invention relates to a self-scoring test device adapted not only to indicate correct responses, but to indicate incorrect responses and alterations as well.

It is the principal object of this invention to provide a quick, accurate and easily handled multiple choice correct response recording and scoring device by the use of which any correct written answer, judgment, or choice to a test item can be readily distinguished from any incorrect answer to the same test item by virtue of the transfer of a mark or other visible signal from an answer sheet to a scoring sheet.

It is another object of this invention to provide such a test device whereby the results of the tests may be obtained quickly, conveniently and accurately by means of either hand or machine scoring by which correct responses are immediately apparent and incorrect responses or alterations in responses are indicated.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated in the single figure of the drawing showing the exposed face of the answer sheet of a multiple choice response test device and broken away and folded back to expose the surface of an underlying scoring sheet and the back surface of the answer sheet.

Referring to the drawing, the self-scoring multiple choice response test device according to this invention is indicated generally at 10 and is comprised generally of a rectangular paper answer or response sheet 11 and one or more underlying paper scoring sheets 12 of the same size and shape with edges in registry with the edges of the answer sheet. The marginal edges of the answer and scoring sheets comprising the test device are preferably sealed together at their edges by means of glue or other adhesive or other suitable fastening means to maintain the answer and scoring sheets in registry and to prevent the examinee from gaining access to the scoring sheet. At the same time the sheets should be readily separable for scoring of the test. These results are best accomplished by tipping the edges of the sheets with a suitable adhesive.

The exposed face surface of the answer sheet 11 is imprinted with indicia to indicate the identification of the particular test or examination, identification of the examinee, and the like. In addition the face surface of the answer sheet is provided with a plurality of marking stations indicated generally at 14. The marking stations are imprinted in any convenient pattern. The questions or test items to which a response is desired may be printed directly on the face of the answer sheet or the response marking stations may be keyed to questions or test items in a separate booklet or sheet.

The particular pattern illustrated shows the marking stations 14 disposed in a plurality of vertical columns with a horizontal row of five marking stations in each column corresponding to a numbered question. This arrangement of marking stations, of course, is adapted to the type of examination wherein the examinee is required to choose the correct response from five possible alternatives. It will be readily understood that this test device is equally adaptable to situations wherein more or fewer choices are available such as, for example, true or false type examinations wherein only two marking stations for each question would be required. The marking stations may obviously be any desired size or shape and may assume the form of square or rectangular boxes, circles, ovals and the like. They may be adapted to receive an "X," a vertical line, horizontal line, to be blocked out completely, etc.

The scoring sheets 12 are imprinted so as to provide preselected localized areas of pressure-sensitive transfer or signalling material underlying the marking stations of the answer sheet. The response indicating material on the scoring sheet is normally not visible but becomes visible as a result of application of pressure, as by marking one of the marking stations of the answer sheet with a pencil, ball point pen, or similar stylus means. The response indicating means on the answer sheet is applied in one predetermined pattern to indicate correct responses and a different pattern to indicate incorrect responses and alterations. As illustrated in broken lines at 15, the response indicating material is applied in a pattern corresponding generally in size and shape and in registry with the marking stations on the answer sheet underlying the particular marking station which corresponds to a correct response for that particular question. Thus, if, as indicated at marking station 3 for question 3 in column 2 of the test sheet, the examinee marks a response with an "X" or a vertical line or otherwise exerts pressure upon the paper sheet within the area defined by the marking station and that response is correct, it will be so indicated upon the scoring sheet by becoming visible on the scoring sheet. Such a correct response is shown at 15A.

The response indicating means is applied in a different pattern underlying those marking stations on the answer sheet which correspond to incorrect answers or responses. This is shown at 16 where the response indicating material is applied in the form of a relatively narrow band extending across the scoring sheet under each of the rows of marking stations on the answer sheet. Thus, if one who is being tested indicates an incorrect answer or response by applying a mark with his stylus in the marking station on the answer sheet other than that corresponding to the correct answer, the result is indicated in a relatively shorter or narrower visible signal on the scoring sheet, as shown, for example, at 16A. It will be seen that when using the patterns of response indicating material illustrated, correct answers are shown by a relatively larger visible mark on the scoring sheet and incorrect answers are shown by a relatively smaller visible mark on the scoring sheet with the result that the number of correct and incorrect responses can readily be ascertained, either manually or by machine, and the test score quickly determined.

If an examinee happens to be generally aware of the manner in which the responses are indicated by virtue of application of pressure by a stylus on the answer sheet and he attempts to improve his score by indicating more than one response to a question (as by applying pressure without leaving a visible mark on the answer sheet with a thumbnail or a non-marking stylus), this fact is immediately apparent on the scoring sheet of the device of this invention and any such response is scored as an error.

On the other hand, if an examinee desires to change his response after he has marked any particular question, he may do so by encircling the original answer and marking a different station to indicate his answer for that question. Such a corrected response is indicated at marking station 5 of question 3 in column 2. The manner in which such a corrected response is revealed on the scoring sheet is shown at 16B where the original incorrect response and portions of the circle indicating correction are shown. If the second answer is correct, credit is given for that particular test item. If the original answer was correct, this is also readily apparent and no credit is given for that particular test item.

It will be apparent that the response indicating material must be in precise registry with the marking stations on the answer sheet. This is accomplished by means well known in the printing art. Registry is maintained by virtue of the edges of the sheet being secured together.

The production of distinctive color markings in the preselected localized areas of the answer sheet may be accomplished in a variety of ways. Reference is made to patents No. 2,548,364–366, issued to Green et al. on April 10, 1951, and Patents No. 2,550,466–473, issued on April 24, 1951. In general, these patents disclose methods by which distinctive color markings may be produced by the use of color forming substances of two kinds, one of which is solid and one of which is liquid, and which are essentially colorless so long as they are insulated from contact with each other, but, when brought together by application of localized pressure, combine to form a visible mark corresponding to the area of applied local pressure. In general, this result is accomplished by the use of two coatings.

As shown in the drawings, the back surface 17 of the answer sheet may be provided with an overall coating comprised of a rupturable film provided with entrapped liquid droplets of the material containing the liquid color-forming substance and the front surface of the scoring sheet 12 is provided with a coating of minute solid color-reactant absorbent particles held in a binder and applied only to the preselected localized areas. It is preferred practice to apply an overall coating of the color reactant particles to the front surface of the scoring sheet 12 and then to desensitize all of those portions except the areas underlying the identification of the examinee and the preselected localized areas underlying the marking stations.

The desensitizing material forms an insulating barrier between the two color-forming materials or otherwise deactivates the color-forming substances so as to prevent contact and formation of color markings upon application of localized pressure over the desensitized areas. The desensitizing ink is applied in a pattern such that sensitized preselected localized areas in registry with the marking stations are left free of desensitizing material in the preselected distinct patterns distinguishing correct and incorrect responses. When the test device is assembled, the two coatings are in contact with one another, but the color-forming materials are maintained insulated until the rupturable film is broken by application of pressure by the marking of an answer in an appropriate marking station on the front of the answer sheet.

It will be understood that the test device of this invention is not limited to the particular combination of color forming substances enumerated in the several Green et al. patents, but is adaptable to the use of any marking material which is essentially colorless or which changes color upon the application of localized pressure whether applied to a single surface or to two surfaces in contact.

If more than one scoring sheet is desired, a plurality of scoring sheets may be assembled with a single answer sheet in making the test devices. If, for any reason, it is desired that the scoring sheet be on the back of the answer sheet, this may be done, and, in this event, the distinctive color markings are formed on the back of the answer sheet.

The back of the last scoring sheet or backing sheet, if one is used, is preferably shaded, stippled or mottled so that the examinee cannot evaluate his responses by holding the test device before a strong light. Instructions for evaluating scores and converting the score results to standard values and other pertinent information may be printed on the back of either the answer or the scoring sheet. In this manner scoring and tabulating can be done with a minimum of time and the resulting information can be quickly indicated on both sheets. The device of this invention is adaptable to most multiple choice question tests and to innumerable other situations where correct responses are hidden from the examinees until the examiner or judge opens the device for inspection and evaluation.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A multiple choice response indicating device comprising a first paper sheet provided on its face surface with a plurality of marking stations representing responses to a plurality of multiple choice test items and at least one second paper sheet of the same size and shape as the first sheet and sealed thereto along their marginal edges, pressure sensitive color indicating means on one of the contacting surfaces between said first sheet and said second sheet underlying and in registry with the marking stations on the exposed face of said first sheet, said color indicating means being disposed in localized preselected areas in distinct patterns representative of correct and incorrect responses respectively, said pattern representing correct responses underlying the respective marking stations corresponding to correct responses, and the pattern representing incorrect responses underlying all of the other marking stations, said localized preselected areas of the pattern representing correct responses differing in size and shape from the localized preselected areas of the pattern representing incorrect responses.

2. A multiple choice response device according to claim 1 further characterized in that said marking stations on the first sheet are aligned in rows, said preselected localized areas of color indicating means on one of the contacting surfaces between said first sheet and said second sheet underlying the marking stations corresponding to correct responses are generally the same size, shape and area as the marking stations and said preselected localized areas of color indicating means underlying all of the other marking stations are relatively narrow bands each underlying one aligned row of marking stations.

3. A multiple choice response device according to claim 2 further characterized in that said marking stations and correct response color indicating areas are generally rectangular and the latter are intersected by relatively narrow bands of incorrect response color indicating means extending the length of each row of marking stations.

References Cited in the file of this patent

UNITED STATES PATENTS

| Number | Name | Date |
|---|---|---|
| 1,705,657 | Clapp | Mar. 19, 1929 |
| 1,883,775 | Finkenbinder | Oct. 18, 1932 |
| 2,548,366 | Green | Apr. 10, 1951 |
| 2,614,338 | Clark | Oct. 21, 1952 |